United States Patent [19]

Sprague et al.

[11] 4,281,904
[45] Aug. 4, 1981

[54] TIR ELECTRO-OPTIC MODULATOR WITH INDIVIDUALLY ADDRESSED ELECTRODES

[75] Inventors: Robert A. Sprague, Saratoga; Richard V. Johnson, Pasadena, both of Calif.

[73] Assignee: Xerox Corporation, Stamford, Conn.

[21] Appl. No.: 40,607

[22] Filed: Jun. 21, 1979

[51] Int. Cl.³ .............................................. G02B 5/14
[52] U.S. Cl. ................................................... 350/356
[58] Field of Search ............ 350/356, 353, 355, 96.13, 350/96.14

[56] References Cited

U.S. PATENT DOCUMENTS

| 3,958,862 | 6/1976 | Scibor-Rylski | 350/356 |
| 4,054,362 | 10/1977 | Baues | |
| 4,125,318 | 11/1978 | Scibor-Rylski | 350/356 |
| 4,175,827 | 11/1979 | McMahon | 350/96.14 |
| 4,181,399 | 1/1980 | McMahon et al. | 350/355 |

OTHER PUBLICATIONS

"Electro—Optical Scanner" by H. Fleisher *IBM Tech. Disclosure Bull.*, vol. 13, No. 12, (May, 1971).
"Switchable Optical Waveguide" by Ash et al. IBM Tech., Disc. Bull., vol. 14, No. 3 (Aug. 1971).

*Primary Examiner*—William L. Sikes
*Assistant Examiner*—León Scott, Jr.

[57] ABSTRACT

Apparatus for converting an electronic signal pattern which comprises a plurality of electronic signals into an image comprising a line of light, with a light intensity profile determined by the electronic signal pattern to achieve a visible display of the signal pattern. A TIR (total internal reflection) type of electro-optic device which has each electrode individually addressed is utilized. To record the displayed signal pattern, the electro-optic device is imaged as a line onto a recording plane so that each individually addressed element of the electro-optic device acts as a light modulator or gate for one picture element along the recording line.

15 Claims, 12 Drawing Figures

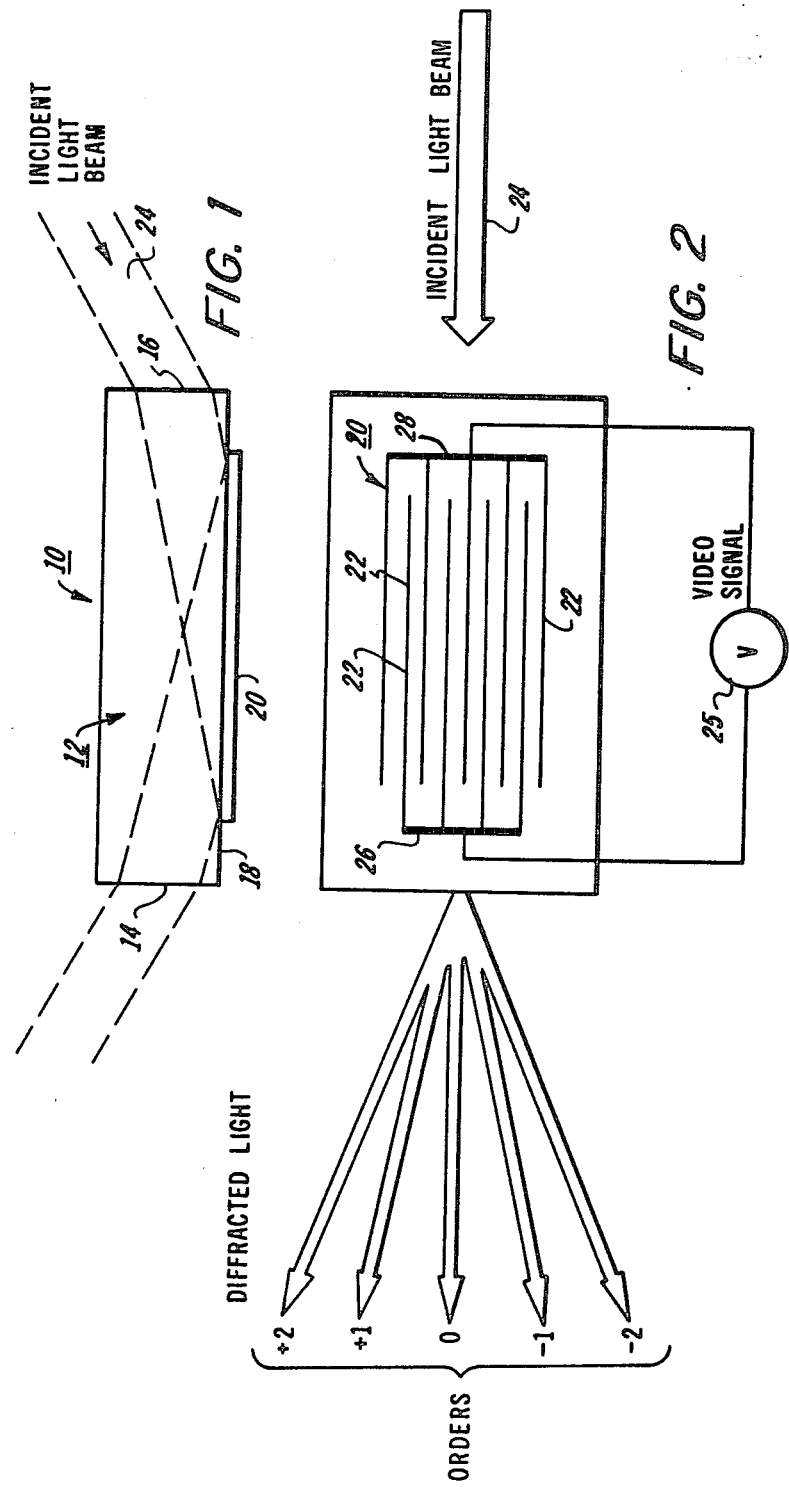

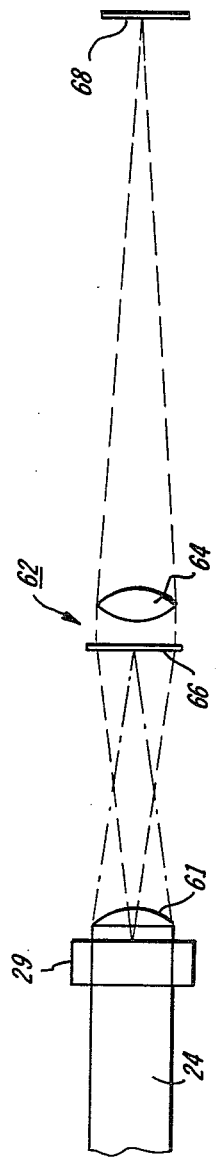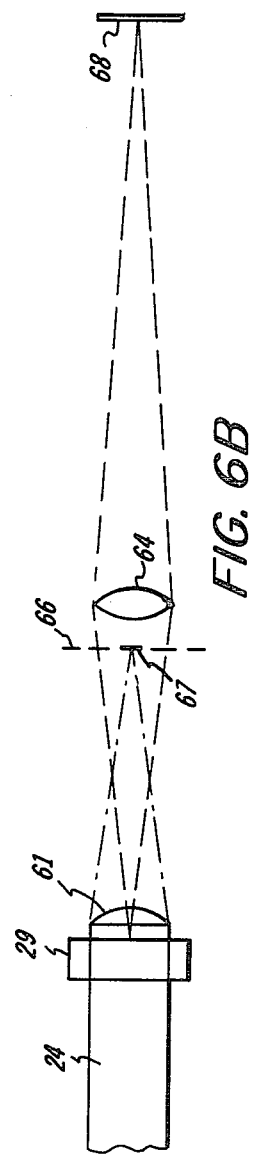

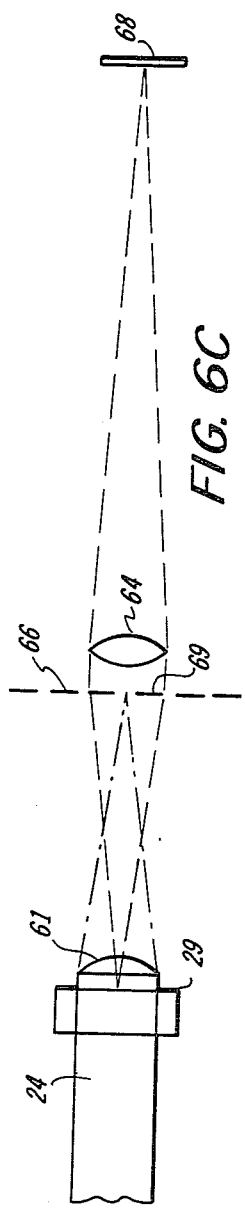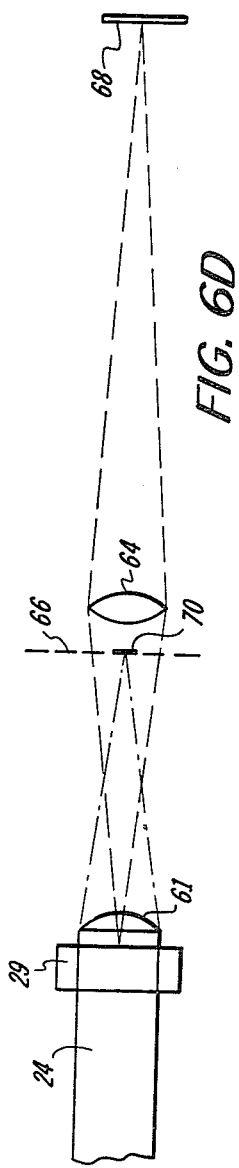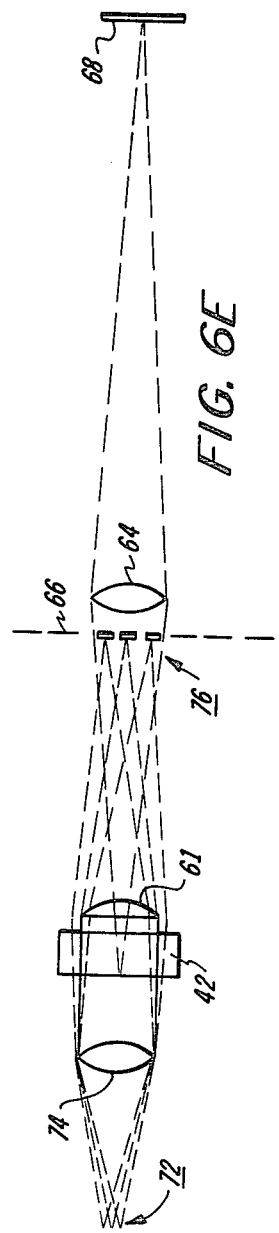

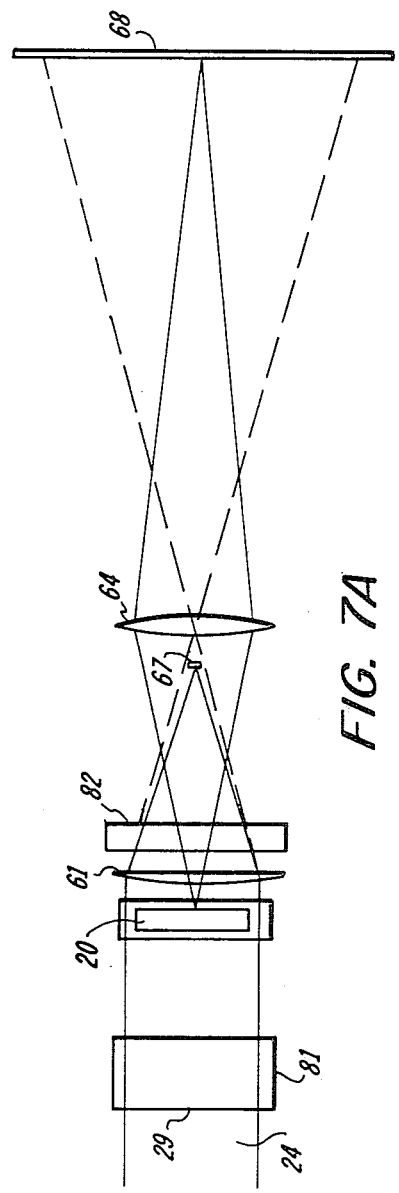
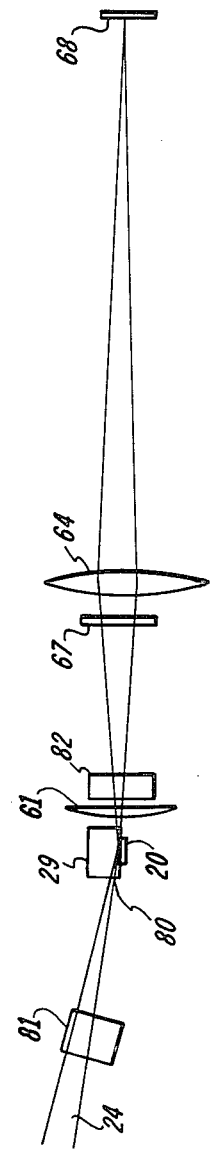
FIG. 7A
FIG. 7B

TIR ELECTRO-OPTIC MODULATOR WITH INDIVIDUALLY ADDRESSED ELECTRODES

BACKGROUND OF THE INVENTION

Particular types of electro-optical modulators have been recently developed, such as, for example, described in U.S. Pat. Nos. 3,958,862 and 4,125,318. The operation of these modulators depends on the effect of applying a voltage to a symmetrical electrode pattern to induce periodic change of the refractive index in an electro-optical element in the region of the surface of the element where the light is totally internally reflected. The resulting symmetrical periodic phase change induced in the wave-front of a light beam directed through or at the electro-optical element produces a far field pattern of the Raman-Nath form exhibiting symmetry about the zero energy order. The zero order of the output beam can then be modulated by adjusting the applied voltage to the electrode pattern to alter the distribution of the light from the zero order into higher orders, and as often desired, to eliminate the zero order.

The electro-optic effect, in general, permits extremely rapid and direct modulation of a light phase front with an electronic drive signal without creation of a sound field as an intermediate step and modulation of the phase fronts with negligible loss of incident light energy, permitting high light throughput efficiency. Unfortunately, previous electro-optic device configurations have been quite complex to fabricate, sensitive to thermal fluctuations, and required high drive voltages and powers. Low drive voltages and powers are feasible with waveguide configurations wherein the light energy is confined in a small volume by total internal reflection, but these devices have not yet demonstrated commercial impact.

An exception to this is the TIR modulator configuration described in the aforementioned patents. This device is easy to fabricate, rugged, relatively insensitive to temperature drift and thermal loading, and extremely fast. It requires a low drive voltage (10 volts to 80 volts is typical) and has a low input capacitance (20 pf. to 80 pf is typical).

The unique characteristics of the TIR modulator which make it attractive for a number of applications are:

(1) High electric fields, and hence high light phase front deformation are achieved with low drive voltages by placing the drive electrodes close together. Electrode pitches of 100μ are typical, but pitches of 1μ may be achieved.

(2) Because the electric field induced by the electrodes is very closely confined to the electrode surface, the interdigitated structure has low capacitance. This is an extremely valuable characteristic for high frequency drive.

(3) The phase grating structure, as distinct from the Pockel's cell modulator configuration, is inherently rugged and temperature-insensitive.

(4) No light beam confinement is necessary, other than simple focusing.

(5) Even though the electric field induced by the electrodes is a skin field, with shallow penetration into the electro-optic crystal, adequate interaction of the light beam with the electric field is assured by a grazing reflection off the electrode surface.

A line composer, for the purposes of this invention, is defined as a system which converts an electronic signal pattern into an image consisting of a line of light, with a light intensity profile along the line specified by the electronic signal pattern. A line composer can be used to image a single point of light on the image line at a specified line position, and to change this line position in time in a prescribed manner.

An example of a practical line composer is the light valve used in the Scophony television system of the 1930's (see for example, D. M. Robinson, "The Supersonic Light Control and Its Application to Television with Special Reference to the Scophony Television Receiver", Proc. IRE, Vol. 27, August 1939, pps. 483-486). The video signal modulates the light phase front through the photo acoustic effect using as an intermediate mechanism a modulated sound carrier moving through a liquid cell. The sound carrier defines a spatial carrier frequency, i.e., effectively a phase diffraction grating which breaks up the light incident upon the cell into discrete diffraction orders. The phase front modulation is converted into a corresponding intensity modulation at the image line through the techniques of phase microscopy.

A drawback to the Scophony light valve is that the sound field moves with the speed of sound through the liquid cell. The image created by such a light valve must also move, because the image is a direct mapping of the sound carrier profile. To freeze the image, a rotating mirror is required in the optics train. A more serious drawback to the Scophony light valve is a resolution and speed limitation imposed by useful light valve apertures and by sound absorption-i.e., materials limitations.

In TIR configurations to date, all the electrodes are joined into two blocks of electrodes, a single drive potential being applied to these two blocks. A periodic light phase front deformation with constant magnitude over the electrode area results. What would be desired is to provide a line composer which utilizes a TIR device, having the structural advantages set forth hereinabove, to convert periodic light phase front deformations generated by an electronic signal pattern into an image consisting of a line of light with a light intensity profile specified by the pattern, such a system providing, for example, a simplified, economical replacement for the rotating polygonal members presently being utilized in raster scanning systems.

SUMMARY OF THE PRESENT INVENTION

The present invention provides apparatus for modulating a plurality of spots along a line of light by varying the voltage on the electrodes formed on a TIR device. In particular, an electronic signal pattern, which comprises a plurality of separate electronic signals, is converted into an image comprising a line of light, with a light intensity profile determined by the electronic signal pattern to achieve a visible display of the signal pattern. A TIR (total internal reflection) type of electro-optic device which has each electrode pair individually addressed is utilized. To record the displayed signal pattern, the electro-optic device is imaged as a line onto a recording plane so that each individually addressed element of the electro-optic device acts as a light modulator or gate for one picture element along the recording line.

The technical problems inherent in utilizing rotating members, such as multifaceted polygons, in prior art raster scanning systems have been overcome by the present invention in that a system utilizing a TIR electro-optic device has been adapted to provide light beam modulation for a plurality of picture elements along a recording plane while retaining the inherent advantages gained by utilizing TIR type devices.

The above TIR device, it should be noted, has separate utility as a line phase modulator and has application as an input device in various optical configurations.

DESCRIPTION OF THE DRAWINGS

For a better understanding of the invention, as well as other objects and further features thereof, reference is made to the following description which is to be read in conjunction with the accompanying drawing wherein:

FIG. 1 shows schematically and illustratively a side view of a prior art type modulator device;

FIG. 2 shows a top view of the device of FIG. 1 using a conventional electrode pattern;

FIGS. 6(a)-6(e) illustrate various phase microscopy configurations for converting the modulated phase fronts produced by the TIR device shown in FIGS. 3-5 into corresponding light intensity variation; and FIGS. 7(a) and 7(b) illustrates a polarization readout technique for reducing image background noise.

DESCRIPTION OF THE PREFERRED EMBODIMENT

Figure 3:
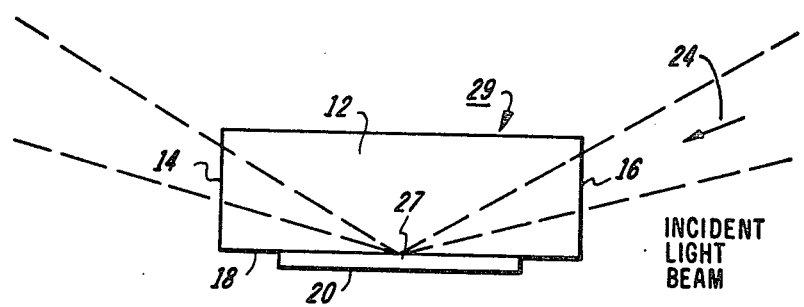
FIG. 3 is a side view illustrating the focusing of the incident beam on the TIR device of the present invention.

Referring to FIG. 1, a typical prior art TIR modulator 10 consists of electro-optic material formed of a LiNbO$_3$ xy cut crystal 12. The crystal 12 has three polished surfaces 14, 16 and 18. The surfaces 14 and 16 are arranged such that a collimated beam of light of single wavelength incident at an angle to the plane of the surface 18 is refracted at the surfaces 14 and 16 to incur total internal reflection at the surface 18. It will be appreciated that other than the shown crystal shapes are possible to achieve the total internal reflection. In the form shown a crystal with overall dimensions of about 4×4×15 mm provides satisfactory operation.

An electrode pattern 20 is deposited on the surface 18 as an array (shown in FIG. 2) with the electrodes 22 parallel to the incident light beam 24. A voltage V, generated by source 25, is applied to the electrode pattern 20 and induces an electric field adjacent the surface 18 which alters the refractive index of the crystal. With the pattern shown, the modulator 10 behaves in a similar manner to a phase diffraction grating to alter the light output beam, the interdigitating electrodes 22 introducing a periodic electric field which penetrates the electro-optic material 12.

The output beam is diffracted into a series of orders as shown, separated by approximately 2-6 milliradians, whose intensities vary with electrode voltage. For example, if a typical full modulation voltage V of 70 volts is applied to the electrodes, the output light beam contains minimal zero order energy, the energy being transferred to the other orders. Thus, if these orders are stopped by suitable obstacles, the incident or original beam direction can be seen to be intensity modulated by the application of the voltage.

As a typical example, the electrodes are 12 μm wide and 3.5 mm long, and the pitch between individual electrodes is 50 μm. Suitable electro-optic materials include LiNbO$_3$, LiTaO$_3$, BSN, ADP, KDP, KD$^x$P, KDA and Ba$_2$NaNb$_5$O$_{15}$.

In the TIR configurations which have been available, all the electrodes are joined into two conducting blocks 26 and 28. A signal drive potential V is then applied to blocks 26 and 28. A periodic light phase front corrugation with constant magnitude over the area of electrode pattern 20 results.

Figure 4:
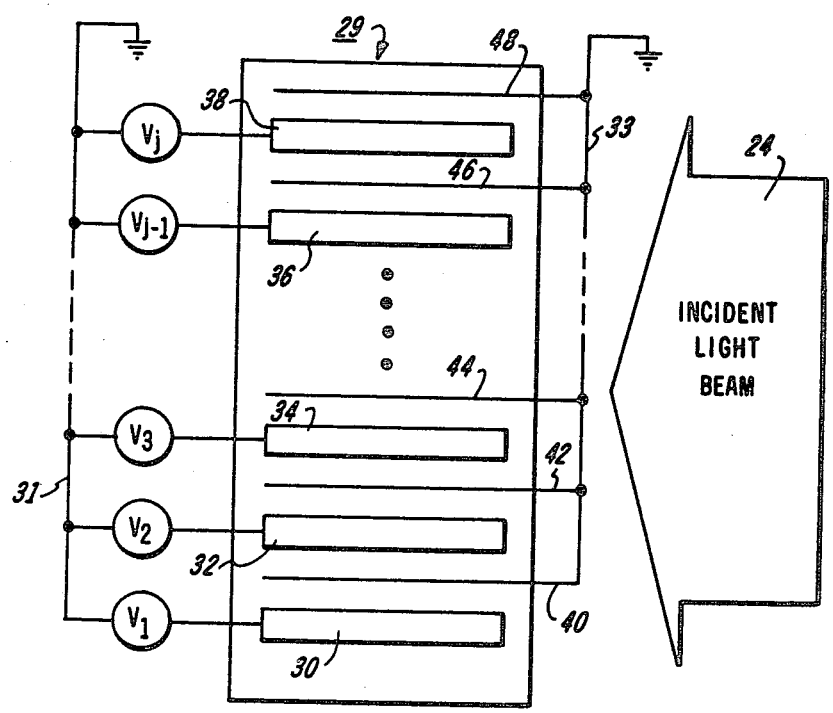
FIG. 4 is a top view of the TIR device shown in FIG. 3 illustrating, inter alia, the individually addressed electrodes formed thereon.

FIGS. 3 and 4 are top and side views, respectively, illustrating the TIR modulator 29 of the present invention. In particular, each electrode of block 31 is connected to its own individual drive voltage while the other block 33 is grounded or set to some other common voltage. Specifically, individual interdigitated electrodes 30, 32, 34 . . . 36 and 38 have separate drive voltage signals $V_1$, $V_2$, $V_3$ . . . $V_{j-1}$ and $V_j$, respectively, applied thereto and electrodes 40, 42 . . . 48 are connected together and coupled to a common voltage, ground in the embodiment illustrated. It should be noted that the basic structure of modulator 29 is identical to modulator 10 described hereinabove except for the novel arrangement of the individually addressed electrodes.

Application of different voltage levels to each of the electrodes 30, 32, 34 . . . 36 and 38 will produce a phase modulation of the beam at the location of each electrode, the magnitude of which is related to the individually applied voltage.

It should be noted that the incident light beam 24 preferably spans the electrodes 30, 32, 34 . . . 36 and 38 to essentially fill the full width of the modulator 29 as shown in FIG. 4. In a preferred embodiment, the light beam 24 is substantially collimated lengthwise of the modulator 29 and is brought to a wedge shaped focus on an internal surface of the modulator 29 along a line 27 which extends widthwise of the electrodes 30, 32, 34 . . . 36 and 38 as shown in FIG. 3.

To use the phase front modulations to achieve intensity variations in the output (i.e. to provide the line composer), phase microscopy techniques may be used so that each electrode affects the image intensity distribution within a localized region of the image line. This region of the image line corresponds directly to the location of the electrode within the array of electrodes.

Phase microscopy techniques for such conversion are described, for example, in J. W. Goodman, Introduction to Fourier Optics, McGraw-Hill Book Company, New York, 1968, pps. 141-146, including the central dark ground technique described therein. All phase microscopy techniques convert a phase front modulation into a corresponding intensity modulation by spatial filtering, the various techniques differing in the spatial filtering function used.

Figure 5:
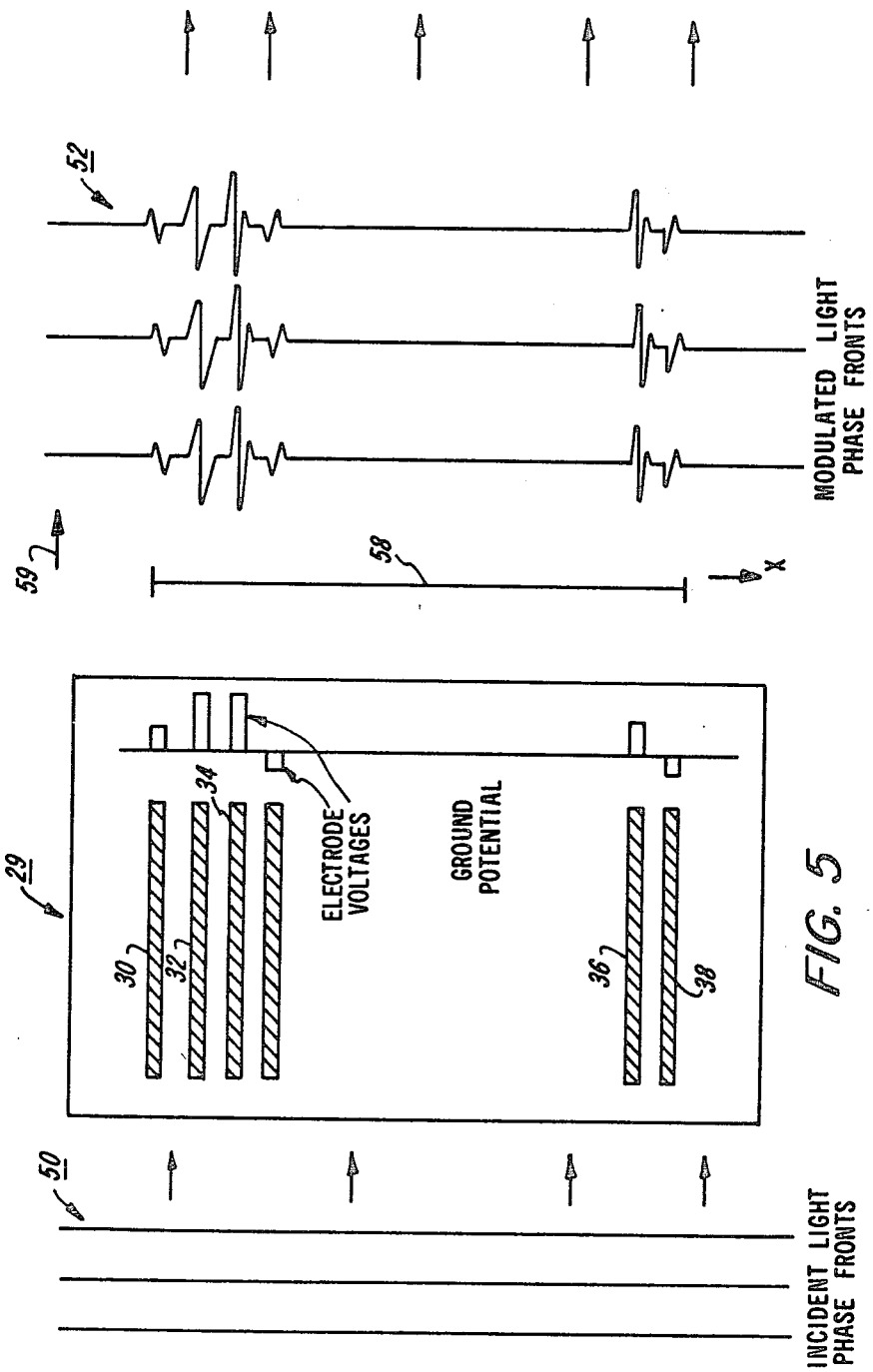
FIG. 5 illustrates how the device of the present invention modulates incident light phase fronts.

FIG. 5 schematically illustrates how incident light phase fronts 50 are modulated by the TIR modulator 29 to produce the modulated light phase fronts 52 (the grounded electrodes have not been shown for purposes of simplicity). The modulated light phase fronts 52 are essentially coextensive to their corresponding electrodes 30, 32, 34 . . . 36 and 38 as shown and extend along a line 58 (for purposes of illustration, shown as in the x-direction) equal to the extension of the electrode array. The magnitude of each pulse of the modulated phase fronts (in the direction of arrow 59) corresponds to the phase of that point along line 58 which in turn is proportional to the drive voltage (illustrated schematically in the figure) applied to its associated electrode. The electrode voltages can be provided by a number of techniques depending upon the application of the modulator 29. Further, the principle of converting modulated phase fronts into corresponding light intensity variations (described in more detail hereinafter with reference to FIGS. 6(a)-6(e) and 7) can be adapted to optical recorders, such as the laser printing system shown in U.S. Pat. No. 3,922,485.

FIGS. 6(a)-6(e) and 7 show the various configurations (in a simplified manner) for converting the phase front modulations produced by modulator 29 into corresponding light intensity variations when voltage is applied to each of the electrodes thereby forming a TIR line composer as previously defined.

Each of the configurations shown makes use of the Fourier transform properties of the optical system. In particular, light input 24, incident on phase modulator device 29, is brought to a focus via field lens 61 at the Fourier transform plane 62 located after the device 29 where it forms a light distribution which is related to the spatial distribution or Fourier transform of the modulated phase front (this plane may be located in front of imaging lens 64 (collects and images light passed by lens 61) as shown or behind, depending on the other optics used and the degree of convergence of the illuminating beam, but always comes to focus at the location where the incident collimated beam would come to focus with no phase modulation applied). The phase readout configurations shown in FIGS. 6(a)-6(e) each place some spatial filtering pattern in this Fourier transform plane 62 which modifies the Fourier transform of the light, thus making the phase modulation visible as intensity variations. This pattern, placed in the transform plane, may consist of clear and opaque apertures or may itself have a phase or amplitude distribution associated with it. In FIG. 6(a), this pattern, called a Fourier transform filter 66, is placed in plane 62. The preferred technique which gives maximum contrast is shown in FIG. 6(b) and is called "dark field readout" or "central dark ground readout". It involves blocking the zero and low order spectral terms in the Fourier transform by stop 67 (which is the focussed central spot) and letting the higher spectral terms pass through the lens 61 and be collected by the imaging lens 64 to form an image at the output image plane 68. An alternative technique which gives the complement of the image formed in FIG. 6(b) is the "bright field" technique shown in FIG. 6(c), in which the higher spectral terms are blocked by stop 69 and only the focussed spot and some of the first diffraction orders are passed through. In FIG. 6(d) the stop 67 is replaced with a 90 degree phase shifter plate 70 in the phase contrast scheme known as the Fritz-Zernike phase contrast technique. This configuration is sometimes used with weakly diffracting phase objects because it provides for such objects an intensity at the output which is linearly proportional to the phase of the object. It should be noted that the stops 67 and 69 and plate 70 are considered to be Fourier transform filters.

It should be noted that the above device embodiments do not require the use of a laser illumination source although such sources may be preferred. In particular, collimated light from a point source having a broad spectral bandwidth would perform very satisfactorily. The degree of phase modulation and the spatial scale of the Fourier transform patterns will be somewhat different for each wavelength within the source spectrum. This may cause some problems if a very complex Fourier transform filter is used but will not cause significant performance degradation for the dark field and bright field embodiments previously described and shown in FIGS. 6(b) and 6(c), respectively. In addition, a source consisting of multiple points, a strip light source or other configurations can be used so long as the dark field zero order field stop is a pattern which suitably intersects the Fourier transform zero order produced by each point on the source. FIG. 6(e) shows a system using dark field illumination with a multiple point source 72, collimating lens 74 and multiple stops 76 in the Fourier transform plane.

The electrodes of the TIR modulator device are relatively long compared to the depth of focus of the imaging system. Because of this the exact focusing of the imaging lens 64 is somewhat undefined. It is achieved by assuming that modulator 29 has an optimum focus plane at which the net electro-optic effect (integrated over the length of the electrodes) is to produce a pure phase variation as if it were located in a well defined object plane. This plane is located by observing the image plane contrast with different electrodes turned on and the dark field stop removed. Since the out of focus image of a phase object is a light pattern exhibiting high contrast intensity fluctuations, the optimum focus is found at the setting which achieves minimum contrast for this test situation. By moving the lens 64 through focus, this optimum location is easily located by minimizing the output contrast.

The phase readout techniques shown in the FIG. 6 embodiments are somewhat sensitive to scratches on the totally internally reflecting surface, and edge defects on the transverse edge of the crystal which is very close to the incident beam. These defects scatter light whether the electrodes are turned on or not, resulting in a background light distribution even with the electrodes turned off. Although this defect can be minimized by polishing good crystal edges and the surfaces, an alternative technique is to use polarization readout of the device which is much less sensitive to this scattered light. Referring to FIGS. 7(a) and 7(b), the incident light is polarized at an angle, preferably of 45 degrees, to the plane of incidence on the TIR surface 80 (plane of crystal orientation) by polarizer 81. The electro-optic effect now results in elliptical polarization of the light, allowing light passing by electrodes which are turned on to go through an analyzer 82 (a polarizer oriented in a crossed direction to the initial plane of polarization and preferably orientated 90 degrees to polarizer 81) placed after the modulator. The background scattered light is substantially reduced using this technique, but the system throughput is also somewhat lower because of losses in the polarizers. The optimal technique of readout thus may vary with the application depending on where maximum contrast (polarization technique) or maximum light throughput (phase microscopy) is required. The combination of both techniques as shown in FIGS. 7(a) and 7(b) could be utilized for maximum background noise rejection (removal of stop 67 will provide the polarization technique itself).

The discussion above has actually denoted two separate aspects of the invention related to the use of the TIR modulator 29 as described hereinabove. First, the TIR modulator 29 having individually addressed electrodes is a component in itself. In this form, it acts as a TIR line phase modulator and has application as an input device for use in optical processing, holographic memories and other related areas. Secondly, the TIR device used in conjunction with an imaging lens and a Fourier transform filter (spatial filter) acts as a TIR line composer (intensity modulator). Such a device has applications in numerous devices, including optical recorders (printers) and any applications which require electrical generation of a light intensity pattern.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or materials to the teachings of the invention without departing from its essential teachings.

What is claimed is:

1. An electro-optic modulator for providing modulated phase fronts of light incident thereon comprising:
   an electro-optical material,
   an electrode pattern array formed on a predetermined surface of said material, said electrode pattern array comprising first and second sets of electrodes, each of the electrodes of said first set being addressable by individual voltage levels, said second set of electrodes being connected to a common voltage level, the voltage levels applied to said first set of electrodes inducing an electric field adjacent said predetermined surface, and
   means for generating light and directing such generated light in a manner such that the light is incident on the material and suffers a single internal reflection from said predetermined surface and travels in a direction substantially parallel to the length of said first and second sets of electrodes, said electric field producing a simultaneous phase modulation of the incident light beam corresponding to the location of each electrode, the local magnitude of which is related to the voltage level applied to that electrode.

2. The modulator as defined in claim 1 wherein said first set of electrodes comprise alternate electrodes of said electrode pattern array and said second set of electrodes comprise the remaining alternate electrodes of said electrode pattern array.

3. The modulator as defined in claim 1 wherein said light generating means comprises a laser.

4. The modulator as defined in claim 1 wherein means are provided to focus said incident light beam to a shaped focus on said predetermined surface.

5. The modulator as defined in claim 1 wherein the electrode pattern array extends along a first dimension of said material and further including means for forming the incident light beam at least as wide as the extent of said first set of electrodes in said first dimension.

6. A system for converting phase front modulations of a light output beam from an electro-optic modulator produced by an electronic signal pattern applied to the modulator into an image comprising a line of intensity modulated light spots comprising:
   an electro-optical material,
   an electrode array pattern formed on a predetermined surface of said material, said electrode array comprising a first and second set of electrodes, each of the first set of electrodes being addressable by individual voltage levels, said second set of electrodes being connected to a common voltage level, the voltage levels applied to said first set of electrodes inducing an electric field adjacent said predetermined surface,
   means for generating light and directing such generated light in a manner such that light is incident on the material and suffers a single internal reflection from said predetermined surface and travels in a direction substantially parallel to the length of the electrodes, said electric field producing a simultaneous phase modulation of the incident light beam corresponding to the location of each electrode, the local magnitude of which is related to the voltage level applied to that electrode,
   means located after said material for focusing the light output beam from the material at a Fourier transform plane,
   spatial filtering means positioned with respect to said Fourier transform plane for making the phase modulations visible as intensity variations, and
   imaging means located after said focusing means for forming an image of the electro-optical material at an output image plane.

7. The system as defined in claim 6 wherein said light generating means comprises a laser.

8. The system as defined in claim 6 wherein means are provided to focus said incident light beam to a shaped focus on said predetermined surface.

9. The system as defined in claim 6 wherein the electrode pattern array extends along a first dimension of said material and further including means for shaping the incident light beam in a manner such that it is at least as wide as the extent of said first set of electrodes in said first dimension.

10. The system as defined in claim 6 wherein said spatial filtering means comprises a light stop which blocks the zero order of the light diffracted by said electro-optic material.

11. The system as defined in claim 6 wherein said spatial filtering means comprises a light stop which blocks the higher orders of the light diffracted by said electro-optic material.

12. The system as defined in claim 6 wherein said light generating means comprises multiple point sources and said spatial filtering means comprises multiple stops.

13. The system as defined in claim 6 further including a light polarizer located between the light generating means and said material and an analyzer located between said material and said imaging means.

14. The system as defined in claim 6 wherein means are provided such that the light incident on the material is substantially collimated along said first dimension of said electro-optical material and brought to a wedge shaped focus on an internal surface of said electro-optical material.

15. A recording device comprising:
   a light gate array comprising an electro-optic material having an electrode pattern array formed on a predetermined surface of said material, said electrode pattern array comprising a plurality of electrodes extending along a first direction of said material, selected ones of said electrodes being addressable by individual voltage levels, the voltage levels applied to said electrodes inducing an electric field adjacent said predetermined surface,
   means for generating light and directing such light towards said material, the light beam incident on said material being at least as wide as the extent of said electrodes in said first direction, said electric field simultaneously modifying the characteristic of the light beam exiting from the locations corresponding to the locations of said addressed electrodes, optical means positioned in the optical path following said material for imaging said electro-optic material at an output image plane as a plurality of light spots corresponding to the location of said addressed electrodes, and a recording media located at said output image plane and responsive to said plurality of light spots to form a record thereof.

* * * * *